United States Patent
Chambers et al.

(10) Patent No.: US 6,289,406 B1
(45) Date of Patent: *Sep. 11, 2001

(54) OPTIMIZING THE PERFORMANCE OF ASYNCHRONOUS BUS BRIDGES WITH DYNAMIC TRANSACTIONS

(75) Inventors: Peter Chambers, Phoenix; Swaroop Adusumilli; Subramanian S. Meiyappan, both of Tempe, all of AZ (US)

(73) Assignee: VLSI Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,325

(22) Filed: Nov. 6, 1998

(51) Int. Cl.[7] .................................................. G06F 13/14
(52) U.S. Cl. ........................... 710/107; 710/126; 370/402
(58) Field of Search .................................... 710/110, 107, 710/126, 118, 125, 105, 129; 737/102

(56) References Cited

U.S. PATENT DOCUMENTS

| | | | |
|---|---|---|---|
| 5,761,444 * | 6/1998 | Ajanovic et al. | 710/100 |
| 5,768,544 * | 6/1998 | Hauck | 710/118 |
| 5,850,530 * | 12/1998 | Chen et al. | 710/113 |
| 5,857,085 * | 1/1999 | Zhang et al. | 395/309 |
| 5,884,052 * | 3/1999 | Chambers et al. | 710/107 |
| 5,913,067 * | 6/1999 | Klein | 713/300 |
| 5,956,493 * | 9/1999 | Hewitt et al. | 711/113 |
| 6,021,483 * | 2/2000 | Adar et al. | 712/29 |
| 6,026,455 * | 2/2000 | Shah et al. | 710/100 |

* cited by examiner

Primary Examiner—Paul R. Myers
(74) Attorney, Agent, or Firm—Wagner, Murabito & Hao LLP

(57) ABSTRACT

A system and method for completing a read transaction between an initiator device and a host memory device in a computer system, in which the present invention optimizes the retry behavior of the initiator device and a target device. The system of the present invention includes a bus bridge device, wherein the bus bridge device includes a target device coupled to the initiator device via a bus; the host memory device coupled to the bus bridge device; and a timer mechanism coupled to the target device. The initiator device is adapted to initiate a present read transaction via the target device, such that an access is asserted between the initiator device and the target device. The timer mechanism is adapted to measure target latency for one or more read transactions preceding the present read transaction, and the timer mechanism is further adapted to use the target latency to calculate a dynamic target latency period. The target device is adapted to maintain the access to the initiator device during the dynamic target latency period. Thus, in accordance with the present invention, the target latency is dynamically measured and used to optimize the retry behavior of the initiator and target devices.

28 Claims, 6 Drawing Sheets

OPTIMIZING THE PERFORMANCE OF ASYNCHRONOUS BUS BRIDGES WITH DYNAMIC TRANSACTIONS

TECHNICAL FIELD

The present invention pertains to the field of computer system bus architectures. More specifically, the present invention pertains to a system and method for optimizing a read transaction in a computer system.

BACKGROUND ART

A bus architecture of a computer system conveys much of the information and signals involved in the computer system's operation. In a typical computer system, one or more buses are used to connect a central processing unit (CPU) to a memory and to input/output devices so that data and control signals can be readily transmitted between these different components. When the computer system executes its programming, it is imperative that data and information flow as fast as possible in order to make the computer system as responsive as possible to the user. With many peripheral devices and subsystems, such as graphics adapters, full motion video adapters, small computer systems interface (SCSI) host bus adapters, and the like, it is imperative that large block data transfers be accomplished expeditiously. These applications are just some examples of peripheral devices and subsystems which benefit substantially from a very fast bus transfer rate.

Much of the computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose.

The electronics industry has, over time, developed several types of bus architectures. Recently, the PCI (peripheral component interconnect) bus architecture has become one of the most widely used and widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of CPU 102 and host memory 104, coupled to PCI-to-host bridge 106 through CPU local bus 108 and memory bus 110, respectively. PCI-to-host bridge 106 is a bi-directional bridge (e.g., a PCI-to-host bridge and a host-to-PCI bridge). PCI bus 112 is coupled to each of PCI initiator devices 114, 116, 118, 120, 122, 124, respectively, and is also coupled to an arbiter (not shown) in PCI-to-host bridge 106.

Referring still to Prior Art FIG. 1, each of PCI initiator devices 114, 116, 118, 120, 122, 124 (hereafter, PCI initiators 114–124) use PCI bus 112 to transmit and receive data. PCI bus 112 is comprised of functional signal lines, for example, interface control lines, address/data lines, error signal lines, and the like. Each of PCI initiators 114–124 are coupled to the functional signal lines comprising PCI bus 112. When one of PCI initiators 114–124 requires the use of PCI bus 112 to transmit or receive data (e.g., a write transaction or a read transaction, respectively), it requests PCI bus ownership from PCI-to-host bridge 106. Upon being granted ownership of PCI bus 112, the PCI initiator device (e.g., PCI initiators 114–124) carries out its respective transaction.

Each of PCI initiators 114–124 may independently request ownership of PCI bus 112. Thus, at any given time, several of PCI initiators 114–124 may be requesting PCI bus ownership simultaneously. Where there are simultaneous requests for ownership of PCI bus 112, PCI-to-host bridge 106 arbitrates between requesting PCI initiators to determine which requesting PCI initiator is to be granted PCI bus ownership. When one of PCI initiators 114–124 is granted ownership of PCI bus 112, it initiates its read or write transaction with a host target device (e.g., host memory 104). When the data transaction is complete, the PCI initiator relinquishes ownership of PCI bus 112, allowing PCI-to-host bridge 106 to reassign PCI bus 112 to another requesting PCI initiator.

Thus, only one data transaction can take place on PCI bus 112 at any given time. In order to maximize the efficiency and data transfer bandwidth of PCI bus 112, PCI initiators 114–124 follow a definitive set of protocols and rules. These protocols are designed to standardize the method of accessing, utilizing, and relinquishing PCI bus 112, so as to maximize its data transfer bandwidth.

With reference now to Prior Art FIG. 2, a typical PCI-to-host bridge design (e.g., PCI-to-host bridge 106) is illustrated. PCI-to-host bridge 106 includes host master 211, data first-in first out (FIFOs) 212, and PCI target 214. PCI-to-host bridge 106 is a bi-directional bridge coupled between host bus 210 and PCI bus 112 (for simplicity, the host-to-PCI portion of the bridge is not shown). Host bus 210 is a bus conforming to any type of protocol.

In the prior art, for a read transaction between a PCI initiator device (e.g., PCI initiator 124) and host memory 104 via PCI-to-host bridge 106, PCI initiator 124 requests and is granted ownership of PCI bus 112 as described above. To access PCI-to-host bridge 106, PCI initiator 124 identifies the bridge by its address, and the bridge (specifically, PCI target 214) recognizes its address and asserts a claim to the access. PCI target 214 in PCI-to-host bridge 106 recognizes that time will be needed to complete this read transaction (the time is needed for host master 211 to claim access to host bus 210, then the requested data are retrieved from host memory 104, and the requested data are returned to and stored in data FIFOs 212). Thus, PCI-to-host bridge 106 immediately retries PCI initiator 124 (that is, PCI-to-host bridge 106 terminates the access to PCI initiator 124), thereby freeing up PCI bus 112 for use by another PCI initiator.

Continuing with Prior Art FIG. 2, while access to host memory 104 continues to proceed in order to retrieve the requested data, PCI initiator 124 retries the access to PCI-to-host bridge 106 (that is, PCI initiator attempts to re-establish the access to PCI target 214 as described above). This retry occurs almost immediately (typically after two clock cycles) after the access is terminated by PCI-to-host bridge 106. PCI-to-host bridge 106 again claims the access and checks data FIFOs 212 to see if the data from host memory 104 have been retrieved. If not, PCI-to-host bridge 106 again retries the access (again terminating the access to PCI initiator 124). This process continues until data are present in data FIFOs 212, at which time the data are read to PCI initiator 124 and the read transaction is completed.

The prior art process described above is problematic because of the number and frequency of retries between PCI initiator 124 and PCI-to-host bridge 106 that occur after the read transaction is initiated until the data are ready to be forwarded from the data FIFOs. During each of these retries, no data are being transferred to PCI initiator 124. In addition, each of these interactions requires ownership of the PCI bus for the period of time needed to complete each interaction, and thus during those periods of time the PCI bus is not available for other PCI devices to initiate transactions or receive data. Thus, in the prior art, nonproductive interactions in which no data are transferred consume a portion of the computer system's bandwidth, and delays are caused to other devices while PCI initiator 124 and PCI-to-host bridge 106 take turns retrying accesses.

In addition, the prior art is problematic because PCI initiator 124 must arbitrate for control of PCI bus 112 prior to each retry, since control of the PCI bus was relinquished when PCI-to-host bridge 106 retried (terminated) the access. Since other transactions initiated by other PCI initiator devices on PCI bus 112 will also be underway, and due to the time needed for the arbitration process, PCI initiator 124 generally will encounter a delay before it is again granted control of PCI bus 112. In the meantime, while PCI initiator 124 is attempting to assert access to PCI-to-host bridge 106, the data sought by PCI initiator 124 have probably already been delivered into data FIFOs 212 from host memory 104. However, PCI initiator 124 is not able to obtain these data until bus arbitration is complete and access is again obtained to PCI-to-host bridge 106. Thus, another disadvantage to the prior art is that transactions are delayed and data transfer is held up because of the regular and arbitrary access retries.

The disadvantages of the prior art are multiplied by the fact that there are more than one PCI initiator devices in a computer system, each PCI initiator device also encountering the same problems as those described above. Thus, in the prior art, a significant number of clock cycles are lost to arbitrating the PCI bus and retrying accesses, and to the consequential delay in data delivery. Hence, in the prior art, the functionality of the computer system and the total data transfer bandwidth of the computer system are diminished.

Accordingly, what is needed is a method and/or system which minimizes the unnecessary access retries between the initiator device and the bus bridge device. What is also needed is a system and/or method that addresses the above need and also reduces the consequences of repeated access attempts, so that the computer system's bandwidth is more optimally utilized. What is further needed is a system and/or method that addresses the above needs and also expedites the delivery of requested data from the bus bridge device to the initiator device. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method and system which minimizes the nonproductive access retries between the initiator device and the bus bridge device and also reduces the consequences of repeated access attempts, so that the computer system's bandwidth is more optimally utilized. The present invention also expedites the delivery of data from the bus bridge device to the initiator device. The present invention is a system and method for completing a read transaction between an initiator device and a host memory device in a computer system, wherein the target latency for the read transaction (that is, the time from the beginning of the read transaction until the data are present in the bus bridge device's data FIFOs) is dynamically measured and used to optimize the retry behavior of the initiator device and a target device.

In the present embodiment, the present invention includes a bus bridge device, which includes the target device that is coupled to the initiator device via a bus; the host memory device, which is also coupled to the bus bridge device; and a timer mechanism, which is coupled to the target device. In the present embodiment, the initiator device, target device and bus are peripheral component interconnect (PCI) devices, and the bus bridge device is a PCI-to-host bridge.

In accordance with the present embodiment of the present invention, the initiator device is adapted to initiate a present read transaction (that is, the read transaction of interest that is executing on the computer system) via the target device, such that an access is asserted between the initiator device and the target device. The timer mechanism is adapted to measure target latency for one or more of the read transactions that precede the present read transaction. In the present embodiment, the timer mechanism determines the target latency by counting the clock pulses that occur during each of the one or more read transactions that precede the present read transaction. The timer mechanism is adapted to use the target latency to calculate a dynamic target latency period. In the present embodiment, the target device is adapted to maintain the access to the initiator device during the dynamic target latency period, for example by inserting wait states to the initiator device.

The dynamic target latency period can also be used to establish a threshold target latency. In this case, the access between the initiator device and the target device is terminated when the threshold target latency is exceeded for a read transaction and data corresponding to the read transaction are not received.

In another embodiment, the present invention includes a sideband signal link from the timer mechanism to the initiator device. The sideband signal link is used to communicate the dynamic target latency period to the initiator device so that the initiator device does not retry the access to the target device until after the dynamic target latency period is exceeded.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
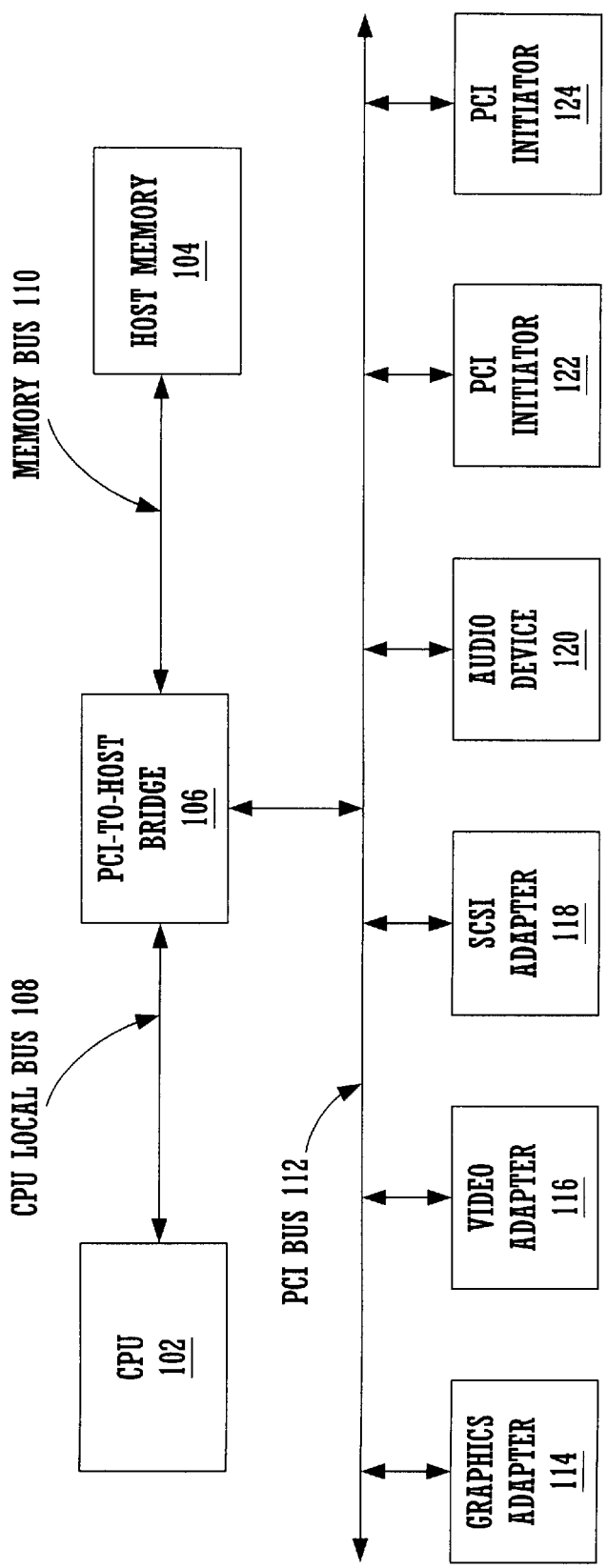
FIG. 1 is a block diagram of a typical peripheral component interconnect (PCI) bus architecture of the prior art.
Figure 2:
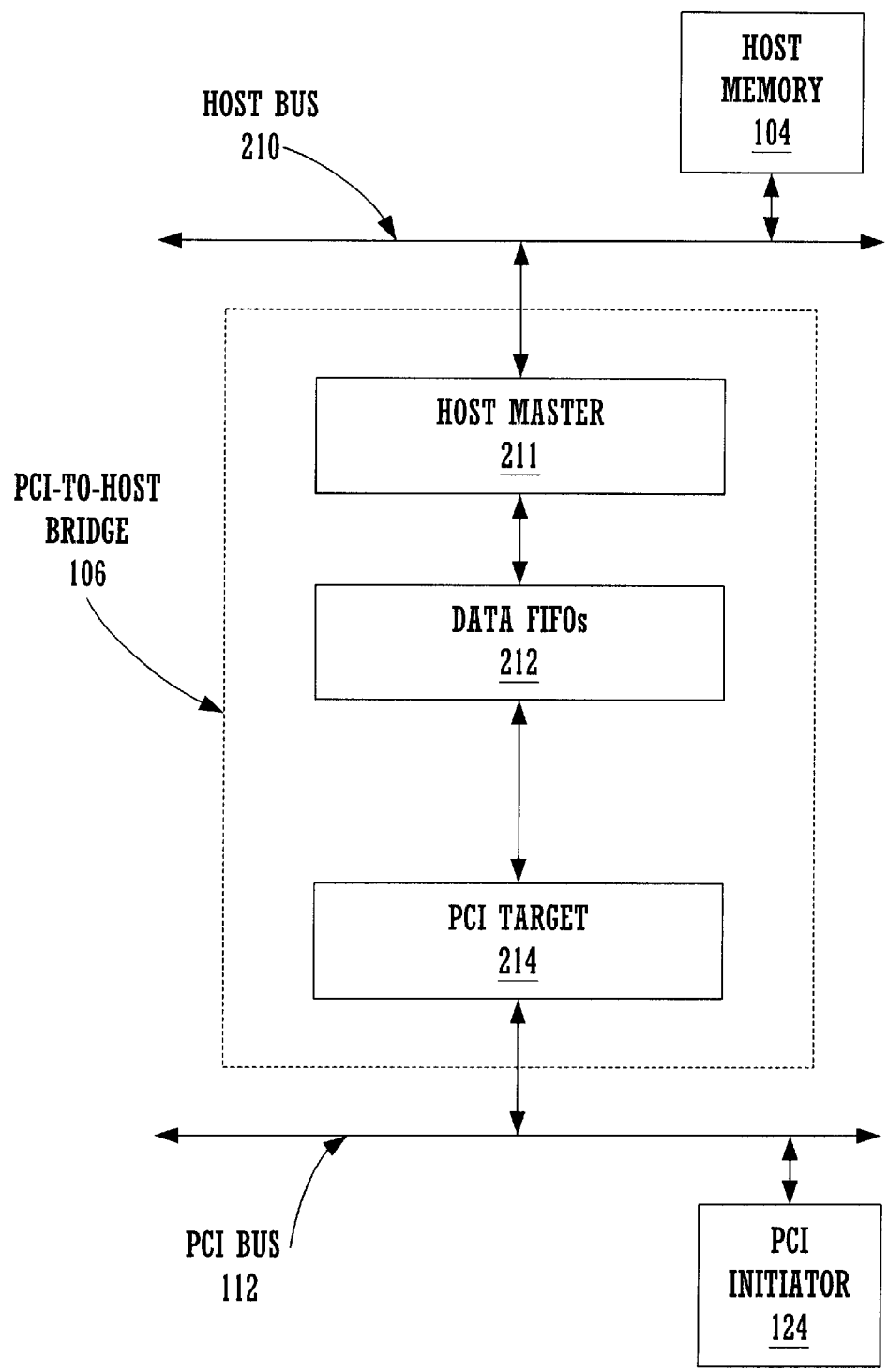
FIG. 2 is a block diagram of a typical PCI-to-host bus bridge device of the prior art.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

The present invention is a system and method for completing a read transaction between an initiator device and a host memory device in a computer system, wherein the target latency for the read transaction (that is, the time from the beginning of the read transaction until the data are present in the bus bridge device's data FIFOs) is dynamically measured and used to optimize the retry behavior of the initiator device and a target device. By optimizing the retry behavior of these devices, the present invention minimizes the nonproductive access retries between the initiator device and the bus bridge device and also reduces the consequences of repeated access attempts. The present invention also expedites the delivery of data from the bus bridge device to the initiator device.

In the present embodiment, the initiator device, target device and bus are peripheral component interconnect (PCI) devices, and the bus bridge device is a PCI-to-host bridge; therefore, the discussion herein is provided in the context of a PCI bus system.

Figure 3:
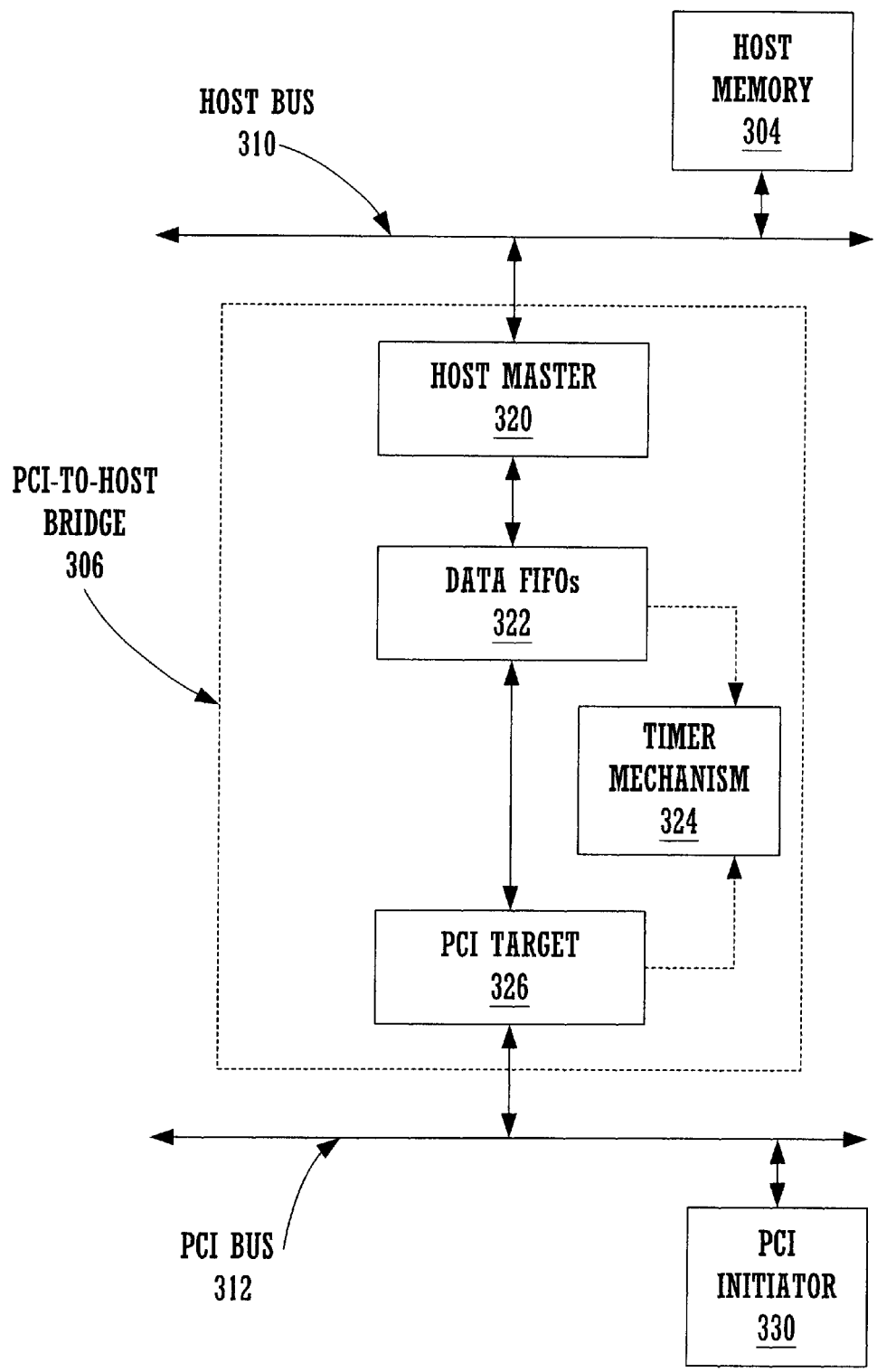
FIG. 3 is a block diagram of a PCI-to-host bus bridge device in an exemplary PCI bus system in accordance with one embodiment of the present invention.

Refer now to FIG. 3, which shows an exemplary PCI bus system implemented in a computer system in accordance with the present embodiment of the present invention. However, it is understood that other configurations of a bus system may be used in accordance with the present invention.

PCI-to-host bridge 306 is a bi-directional bridge coupled between PCI bus 312 and host bus 310 (for simplicity, the host-to-PCI portion of the bridge is not shown). Host bus 310 is a bus conforming to any protocol. Host memory 304 is coupled to host bus 310. PCI initiator 330 is coupled to PCI bus 312. PCI initiator 330 is a bus master that is capable of initiating a transaction (e.g., a read transaction or a write transaction).

Generally speaking, when PCI initiator 330 requires the use of PCI bus 312 to transmit or receive data, it requests ownership of PCI bus 312 from PCI-to-host bridge 306. When other PCI initiator devices are present on PCI bus 312, there may be simultaneous requests for bus ownership. In this case, a PCI arbiter arbitrates between the requesting PCI initiators and grants bus ownership to one of them. In the embodiment illustrated by FIG. 3, PCI-to-host bridge 306 hosts the arbiter (e.g., PCI target 326).

Once ownership of PCI bus 312 is obtained, PCI initiator 330 initiates its read or write transaction with a host target device (e.g., host memory 304). When the transaction is completed, and at various stages between initiation and completion, ownership of PCI bus 312 may be taken away from PCI initiator 330 by PCI-to-host bridge 306.

Referring still to FIG. 3, PCI-to-host bridge 306 includes host master 320, data FIFOs (first-in, first-out) 322, and PCI target 326. Other components and devices typical of a PCI-to-host bridge may be incorporated into PCI-to-host bridge 306 in accordance with the present invention; for simplicity, those components are not shown in FIG. 3. Host master 320 functions to obtain ownership of host bus 310 when needed in order to perform a transaction. As mentioned above, PCI-to-host bridge 306 serves as the arbiter for PCI bus 312. PCI target 326 is also used to assert (claim) an access when PCI-to-host bridge 306 is addressed by PCI initiator 330.

Data FIFOs 322 are used to temporarily store read and write data during a transaction. For example, data read from host memory 304 are stored in data FIFOs 322 until ownership of PCI bus 312 is obtained so that the data can be forwarded to PCI initiator 330. In this manner, it is not necessary to obtain simultaneous ownership of both host bus 310 and PCI bus 312 in order to perform a transaction between PCI initiator 330 and host memory 304.

With reference still to FIG. 3, in accordance with the present embodiment of the present invention, PCI-to-host bridge 306 incorporates timer mechanism 324. Timer mechanism 324 functions to optimize the retry behavior of PCI-to-host bridge 306 and PCI initiator 330, as will be explained in detail later herein. It is understood that in other embodiments of the present invention, timer mechanism 324 may be implemented differently; for example, in another embodiment, timer mechanism 324 is integrated into PCI target 326.

Timer mechanism 324 is used to measure the time from the beginning of a read transaction to when the data are available in data FIFOs 322 (this time period is referred to herein as the target latency). In the present embodiment, timer mechanism 324 is designed to count the clock pulses issued by the PCI clock (not shown). The PCI clock issues clock pulses at a fixed frequency in order to synchronize transactions in the PCI bus system. Thus, timer mechanism 324 is able to acquire an accurate measurement of target latency by counting clock pulses in accordance with the present embodiment.

Timer mechanism 324 is also designed to use the count of clock pulses to determine a dynamic target latency period that in turn is used, as will be described later herein, to optimize the retry behavior of PCI-to-host bridge device 306 and PCI initiator 330 during a present read transaction (that is, the particular read transaction that is of interest in the PCI bus system). The dynamic target latency period is a history profile of one or more read transactions that have occurred prior to the present read transaction. Timer mechanism 324 measures the target latency associated with read transactions that have occurred prior to the present read transaction by counting and recording the number of clock pulses that occurred during those prior read transactions.

In one implementation of the present embodiment, the dynamic target latency period is specified as the target latency of the read transaction immediately prior to the present read transaction. In another implementation of the present embodiment, the following formula is used to specify the dynamic target latency period (DTLP) as the weighted average of the target latency (TL) for the three most recent read transactions prior to the present read transaction (designated as n−1, n−2, and n−3, respectively):

$$DTLP=(4*TL_{n-1}+2*TL_{n-2}+2*TL_{n-3})/8.$$

The formula above advantageously provides a balanced representation of the recent target latency history, and is also readily calculated in a computer system because dividing by eight only requires a shift to the right of three places. In each of the above approaches, the dynamic target latency period is dynamically updated to provide an accurate representation of target latency history. Furthermore, it is understood that the dynamic target latency period can be specified in other ways in accordance with the present invention.

In the present embodiment, timer mechanism 324 communicates the delayed target latency period to PCI target 326. In the present embodiment, PCI target 326 is designed so that it will not retry (terminate) the access with PCI initiator 330 for the period of time (e.g., the number of clock pulses) corresponding to the dynamic target latency period. Consequently, because the access is maintained and PCI bus 312 is not relinquished, there is no need for PCI initiator 330 to subsequently arbitrate and seek acquisition of PCI bus 312 or retry the access.

Therefore, in accordance with the present embodiment of the present invention, the dynamic target latency period is derived based on actual measurements of target latency, and therefore represents a solid basis for measuring PCI bus system performance. The dynamic target latency period is used as a predictor to estimate how long it will take to complete the present read transaction, and the access asserted between PCI-to-host bridge 306 and PCI initiator 330 is maintained for that period. In this manner, the present invention modifies the retry behavior of these devices, thereby reducing the number of nonproductive access retries between these devices as well as the associated consequences. In addition, if the requested data are present in data FIFO 322, then the data are expeditiously forwarded to PCI initiator 330 without the delay associated with acquiring ownership of PCI bus 312 and retrying the access with PCI target 326. The present invention thus results in more efficient utilization of the bandwidth available in the computer system.

In accordance with the PCI specification, the present invention imposes an upper threshold value on the dynamic target latency period so that the access asserted for the present read transaction does not monopolize PCI bus 312 without limit. The current PCI specification requires that the access not exceed a specified number of PCI clock pulses (e.g., 16 PCI clock pulses) in anticipation of a transfer of data. Hence, in accordance with the present embodiment of the present invention, the access for the present read transaction is maintained for a period as long as the dynamic target latency period but not exceeding the specified number of clock pulses (e.g., 16 clock pulses).

However, the dynamic target latency period determined in accordance with the present invention can also be used advantageously to specify an upper threshold value of less than the number of clock cycles specified in the PCI specification. For example, if the target latency history profile generated from past read transactions demonstrates that a shorter period of time is justified, the upper threshold value can be correspondingly reduced from 16 clock pulses, thereby freeing up PCI bus 312 and resulting in more efficient utilization of the computer system's bandwidth. The present invention provides a basis supported by measurements of the system performance to specify an upper threshold value shorter than that required by the PCI specification.

Figure 4:
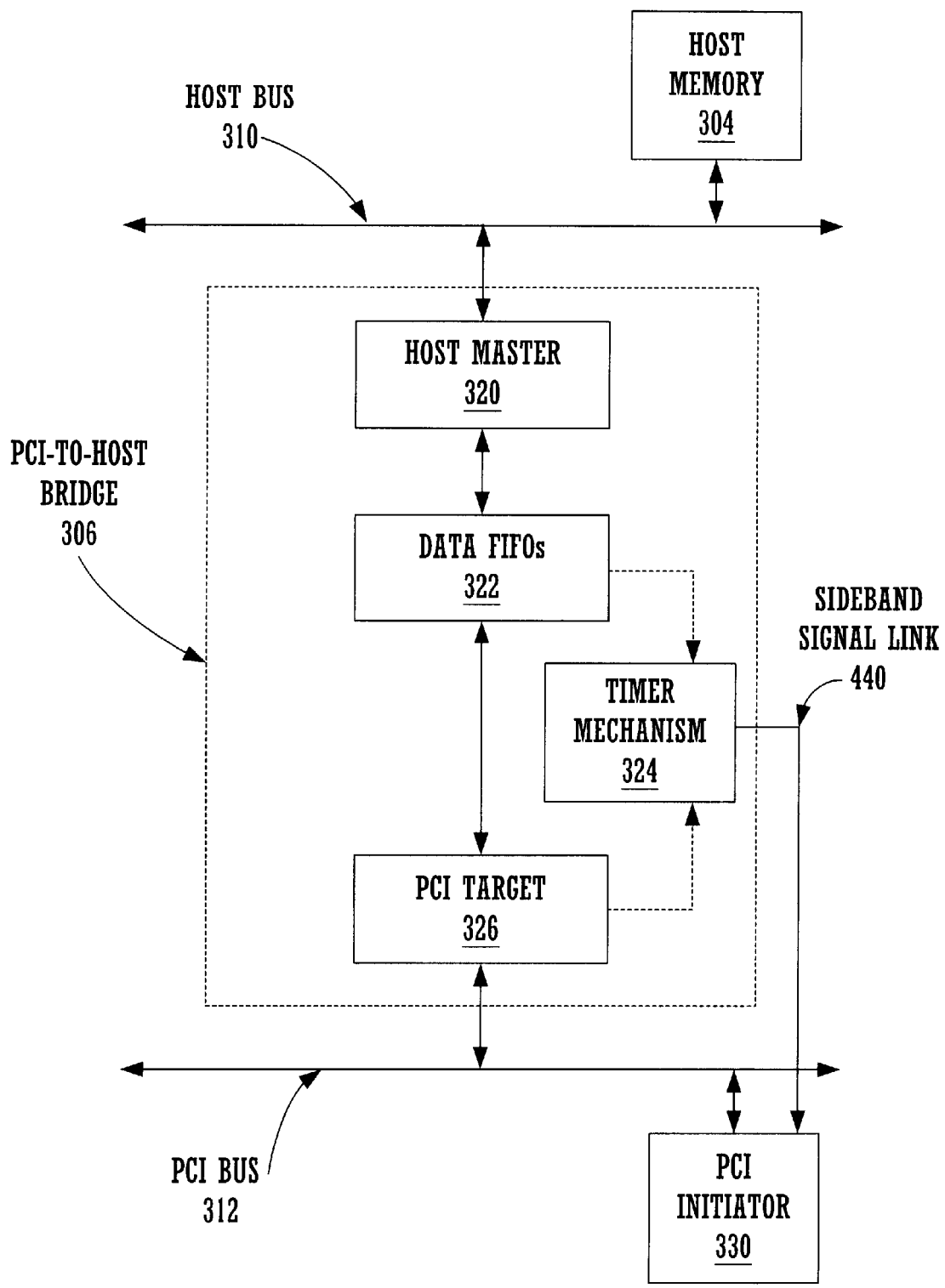
FIG. 4 is a block diagram of a PCI-to-host bus bridge device in an exemplary PCI bus system in accordance with a second embodiment of the present invention.

With reference now to FIG. 4, another embodiment of the present invention is illustrated. In this embodiment, in addition to the connection with PCI target 326, timer mechanism 324 is coupled to PCI initiator 330 via sideband signal link 440. Timer mechanism 324 uses sideband signal link 440 to communicate the dynamic target latency period to PCI initiator 330. In this embodiment, sideband signal link 440 is a bus that is external to PCI bus 312.

Continuing with reference to FIG. 4, in this embodiment, PCI initiator 330 is designed so that it will not retry the access to PCI target 326 for the period of time (e.g., the number of clock pulses) corresponding to the dynamic target latency period. In other words, PCI initiator 330 will not retry the access until it expects, based on the recent history of target latency from prior read transactions, that the data requested in the present read transaction are present in data FIFOs 322. Thus, in this embodiment, PCI bus 312 can be utilized in the interim by other PCI initiators on the bus. In this manner, this embodiment of the present invention reduces the number of nonproductive access retries as well as the associated consequences. This embodiment of the present invention thus causes more efficient utilization of the bandwidth available in the computer system.

Figure 5:
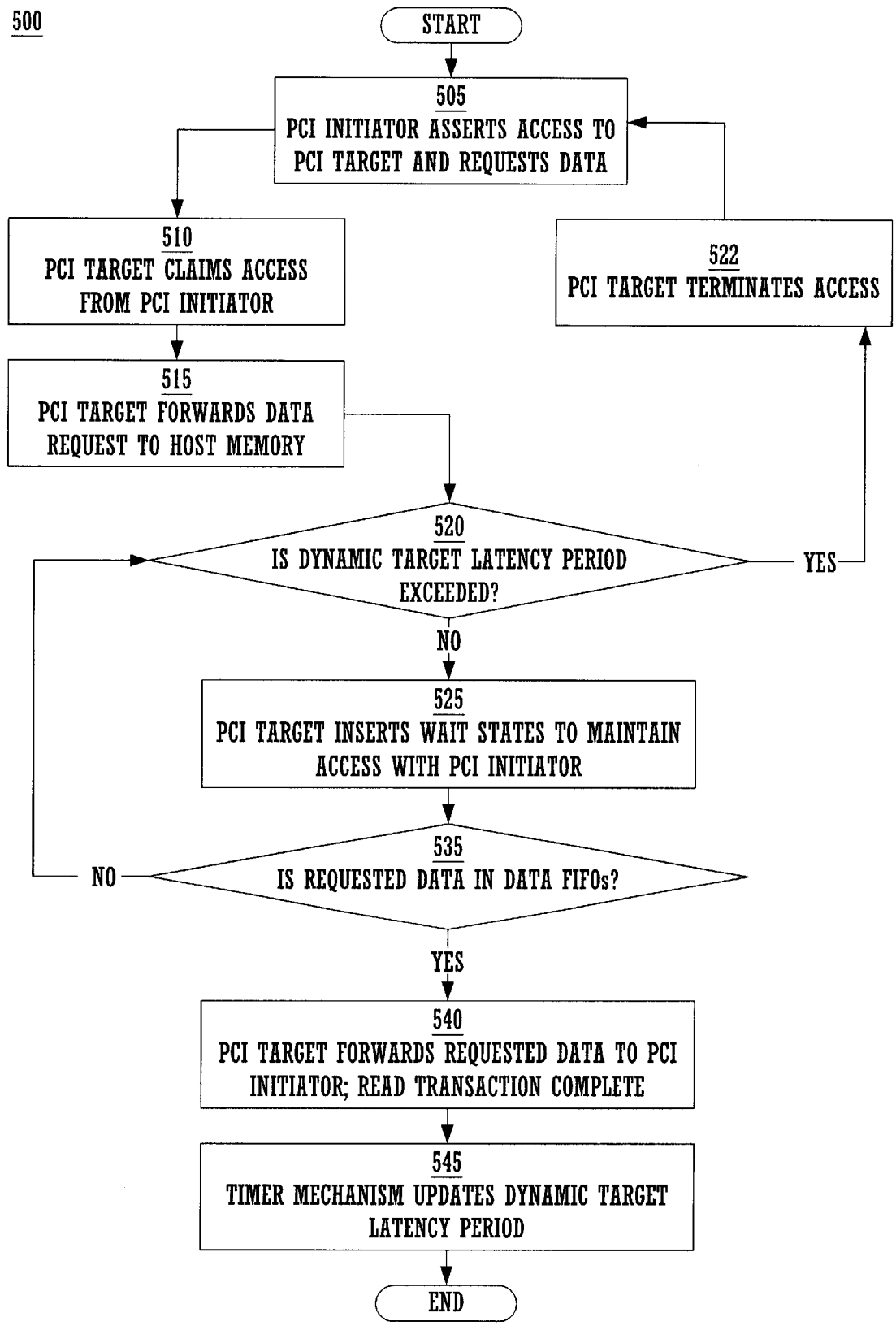
FIG. 5 is a flowchart of a process for completing a transaction in accordance with the embodiment of the present invention illustrated in FIG. 3.

With reference now to FIG. 5, a flowchart is provided showing process 500 utilized in accordance with one embodiment of the present invention (specifically, the embodiment illustrated by FIG. 3). Process 500 is used to optimally complete a present read transaction between PCI initiator 330 and host memory 304 of FIG. 3. Note that process 500 is not intended to convey all of the steps associated with completing a read transaction in a PCI bus system, but only conveys those steps pertinent to completing a read transaction in accordance with the present invention.

With reference to FIGS. 3 and 5, in step 505 PCI initiator 330 initiates a request for data from host memory 304 (e.g., the present read transaction). PCI initiator 330 arbitrates access to PCI bus 312 and requests access to PCI-to-host bridge 306 in accordance with the PCI specification.

In step 510, also in accordance with the PCI specification, PCI target 326 claims the access from PCI initiator 330, thereby establishing communication between these devices as well as a path to host memory 304.

In step 515, PCI target 326 forwards the present read transaction from PCI initiator 330 to host memory 304 via data FIFOs 322, host master 320 and host bus 310.

In step 520, PCI target 326 knows the dynamic target latency period that has been calculated by timer mechanism 324, as described above. As discussed previously, the dynamic target latency period is used to maintain the access between PCI target 326 and PCI initiator 330 for a period of time (e.g., a number of clock pulses) during which the request data are anticipated to become available.

Thus, in step 520, PCI target 326 operates in conjunction with timer mechanism 324 to determine whether the dynamic target latency period is exceeded for the present read transaction. For example, the number of clock pulses that have transpired at this point of the present read transaction are compared to the number of clock pulses specified for the dynamic target latency period. Provided that the dynamic target latency period is not exceeded, PCI target 326 does not retry (terminate) the access to PCI initiator 330, thereby maintaining the initial access that was established in steps 505 and 510.

Provided that step 520 is satisfied, in step 525 PCI target 326 inserts wait states to PCI initiator 330 in order to maintain the access to PCI initiator 330. The number of wait states inserted is equal to the number of clock pulses needed to equate the wait for the requested data and the dynamic target latency period. For example, if two clock pulses have transpired for the present read transaction and the dynamic target latency period is ten clock pulses, then wait states are inserted for eight clock pulses. In this manner, the present invention extends the length of the access between PCI initiator 330 and PCI target 326 to the time that is anticipated to be sufficient for the data to be retrieved from host memory 304 and forwarded to data FIFOs 322. Thus, instead of arbitrarily terminating the access, the present invention maintains the access for the amount of time that, based on the experience from prior read transactions, is expected to result in the requested data being ready for transfer to PCI initiator 330. The present invention thereby eliminates unnecessary retry accesses, thus more optimally utilizing the bandwidth of the computer system, while expediting data delivery.

In step 535, PCI target determines whether the requested data are in data FIFOs 322. If so, in step 540 the data are forwarded to PCI initiator 330 using the access maintained per steps 520 and 525. If not, in accordance with the present embodiment, PCI target 326 continues to maintain the access for the remainder of the dynamic target latency period per steps 520 and 525.

In step 522, when the dynamic target latency period is exceeded per step 520, PCI target 326 retries (terminates) the access with PCI initiator 330 in accordance with the PCI specification. Thus, PCI bus 312 is now free for other transactions initiated by other PCI initiator devices on the PCI bus. In this manner, the present invention effectively balances the present read transaction and other transactions by optimizing the amount of time needed for the present read transaction based on the performance of the PCI bus system.

Subsequent to step 522, PCI initiator 330 retries the access per step 505 in accordance with the PCI specification, and steps 510 and 520 are repeated until data are present in data FIFOs 322 and forwarded to PCI initiator 330 (per steps 535 and 540, respectively). Note that step 515 is not necessarily repeated; that is, each time PCI target 326 claims the access for the present transaction, a new request to host master 320 is not generated. If there are data in data FIFOs 322, PCI target 326 may service the access without generating a request to host master 320.

In step 545, timer mechanism 324 uses the time it took to complete the present read transaction to update the calculation of the dynamic target latency period, as described previously. The updated dynamic target latency period is used with the next read transaction occurring over the PCI bus system in accordance with the present embodiment. The present invention thereby provides a dynamic measurement of past performance that is used to optimize the future performance of the PCI bus system.

Figure 6:
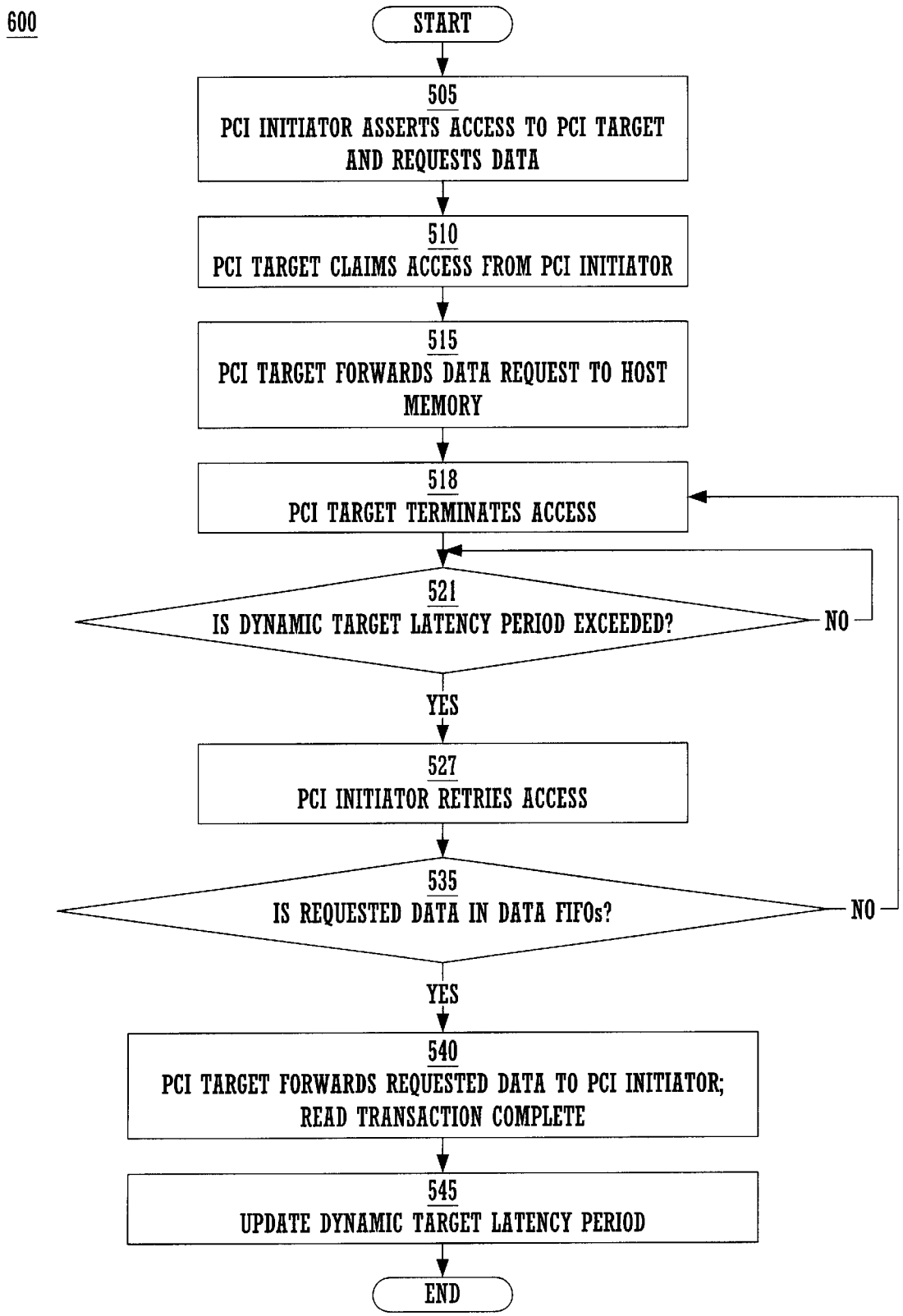
FIG. 6 is a flowchart of a process for completing a transaction in accordance with the embodiment of the present invention illustrated in FIG. 4.

With reference now to FIG. 6, a flowchart is provided of process 600 used in accordance with another embodiment of the present invention (specifically, the embodiment of FIG. 4 in which sideband signal link 440 is used to communicate the dynamic target latency period to PCI initiator 330). In this embodiment, steps 505, 510 and 515 are as described above in conjunction with FIG. 5 and are performed in accordance with the PCI specification.

With reference to FIGS. 4 and 6, in step 518 of this embodiment, PCI target 326 retries (terminates) the access to PCI initiator 330 immediately. Thus, PCI bus 312 is freed up for other transactions initiated by other PCI initiators on the PCI bus.

In step 521, in conjunction with timer mechanism 324 via sideband signal link 440, PCI initiator 330 determines whether the dynamic target latency period is exceeded based on the count of the clock pulses that have occurred since the present read transaction was initiated. If the dynamic target latency period is not exceeded for the present read transaction, then PCI initiator 330 waits before retrying the access to PCI target 326. The present invention thereby precludes arbitrary retry accesses from occurring before the requested data are anticipated to be available, thus more optimally utilizing the bandwidth of the computer system. Hence, PCI bus 312 remains free for other transactions initiated by other PCI initiators on the PCI bus.

In step 527, once the dynamic target latency period is exceeded for the present read transaction, PCI initiator 330 arbitrates for acquisition of PCI bus 312 and retries the access to PCI target 326.

In step 535, PCI target determines whether the requested data are in data FIFOs 322. Because the dynamic target latency period is exceeded, based on the past system performance it is anticipated that the request data will be present. If so, in step 540, the data are forwarded to PCI initiator 330 using the access asserted as a result of step 527. Thus, this embodiment of the present invention expedites the delivery of the requested data and while also optimally utilizing the bandwidth of the computer system.

If the data are not in data FIFOs 322, in this embodiment PCI target 326 retries (terminates) the access per step 518.

Process 600 continues in this manner until the requested data are in data FIFOs 322.

Upon completion of the present read transaction (step 540), in step 545 timer mechanism 324 uses the time it took to complete the present read transaction to update the calculation of dynamic target latency period, as described previously. The updated dynamic target latency period is used with the next read transaction occurring over the PCI bus system in accordance with this embodiment of the present invention.

The present invention thus provides a system and a method which optimizes the functionality and the total data transfer bandwidth of the computer system. The present invention minimizes the number of access retries between the initiator device and the bus bridge device that are associated with a read transaction. The present invention also reduces the consequences associated with repeated access attempts, for example by reducing the amount of time that bus ownership is being used for transactions in which data are not transferred. The present invention thereby frees up the bus for other transactions initiated by other devices on the bus. In addition, the present invention expedites the delivery of requested data associated with the read transaction.

The preferred embodiment of the present invention, optimizing the performance of asynchronous bus bridges with dynamic transactions, is thus described. While the present invention has been described in particular embodiments, it should be appreciated that the present invention should not be construed as limited by such embodiments, but rather construed according to the following claims.

What is claimed is:

1. A system for completing a present read transaction between an initiator device and a host memory device in a computer system, said system comprising:
   a bus;
   a bus bridge device, said bus bridge device comprising:
      a target device, said target device coupled to said initiator device via said bus; and
      a timer mechanism coupled to said target device; and
      said host memory device coupled to said bus bridge device;
   said initiator device adapted to assert an access to said target device, such that said present read transaction is initiated;
   said timer mechanism adapted to measure target latency for one or more read transactions contiguously preceding said present read transaction, said timer mechanism further adapted to use said target latency to determine a dynamic target latency period and to update said dynamic target latency period after each read transaction; and
   said bus bridge device adapted to maintain said access to said initiator device during said dynamic target latency period, thereby facilitating completion of said present read transaction.

2. The system of claim 1 wherein said initiator device, said target device, and said bus are peripheral component interconnect (PCI) devices and said bus bridge device is a PCI-to-host bridge device.

3. The system of claim 1 wherein said target device and said timer mechanism are fabricated as a single device.

4. The system of claim 1 wherein said target device inserts one or more wait states to maintain said access to said initiator device during said dynamic target latency period.

5. The system of claim 1 wherein said timer mechanism makes a count of clock pulses that occur during each of said one or more read transactions.

6. The system of claim 5 wherein said dynamic target latency period is based on said count of clock pulses corresponding to a read transaction most recently preceding said present read transaction.

7. The system of claim 5 wherein said dynamic target latency period is based on an average of said count of clock pulses corresponding to a plurality of read transactions preceding said present read transaction.

8. The system of claim 1 wherein a threshold target latency is established based on said dynamic target latency period, and said access is terminated when target latency for said present read transaction exceeds said threshold target latency and data corresponding to said present read transaction are not received by said bus bridge device.

9. The system of claim 1 further comprising a sideband signal link between said timer mechanism and said initiator device, said sideband signal link used to communicate said dynamic target latency period to said initiator device.

10. The system of claim 9 wherein said initiator device is adapted to delay a retry of said access until said dynamic target latency period is exceeded.

11. A system for completing a present read transaction between an initiator device and a host memory device in a computer system, said system comprising:
   a bus;
   a bus bridge device, said bus bridge device comprising:
      a target device, said target device coupled to said initiator device via said bus; and
      a timer mechanism coupled to said target device, wherein said timer mechanism is also coupled to said initiator device; and
   said host memory device coupled to said bus bridge device;
   said timer mechanism adapted to measure target latency for one or more read transactions contiguously preceding said present read transaction, said timer mechanism further adapted to use said target latency to determine a dynamic target latency period and to update said dynamic target latency period after each read transaction; and
   said initiator device adapted to delay a retry of said access until said dynamic target latency period is exceeded.

12. The system of claim 11 wherein said initiator device, said target device, and said bus are peripheral component interconnect (PCI) devices and said bus bridge device is a PCI-to-host bridge device.

13. The system of claim 11 wherein said timer mechanism and said initiator device are coupled via a sideband signal link.

14. The system of claim 11 wherein said timer mechanism makes a count of PCI clock pulses that occur during each of said one or more read transactions.

15. The system of claim 14 wherein said dynamic target latency period is based on said count of PCI clock pulses corresponding to a read transaction most recently preceding said present read transaction.

16. The system of claim 14 wherein said dynamic target latency period is based on an average of said count of clock pulses corresponding to a plurality of read transactions preceding said present read transaction.

17. The system of claim 11 wherein said target device is coupled to said timer mechanism.

18. The system of claim 17 wherein said bus bridge device is adapted to maintain said access to said initiator device during said dynamic target latency period.

19. The system of claim 17 wherein said target device inserts one or more wait states to maintain said access to said initiator device during said dynamic target latency period.

20. The system of claim 17 wherein a threshold target latency is established based on said dynamic target latency period, and said access is terminated when target latency for said present read transaction exceeds said threshold target latency and data corresponding to said present read transaction are not received by said bus bridge device.

21. The system of claim 17 wherein said target device and said timer mechanism are fabricated as a single device.

22. In a peripheral component interconnect (PCI) bus system comprising a PCI initiator device coupled to a host memory device via a bus bridge device, said bus bridge device comprising a timer mechanism coupled to a PCI target device, a method for completing a present read transaction between said PCI initiator device and said host memory device, said method comprising the steps of:

a) said timer mechanism measuring target latencies for one or more read transactions contiguously preceding said present read transaction, said timer mechanism coupled to said PCI target device;

b) said timer mechanism determining a dynamic target latency period using said target latencies; wherein said dynamic target latency period is updated after each read transaction; and c) said PCI initiator device asserting an access, such that said present read transaction is initiated;

d) said PCI target device claiming said access;

e) using said dynamic target latency period to specify when said access is to be retried.

23. The method of claim 22 wherein said PCI target device and said timer mechanism are fabricated as a single PCI device.

24. The method of claim 22 wherein step a) further comprises said timer mechanism making a count of clock pulses that occur during each of said one or more read transactions preceding said present read transaction.

25. The method of claim 22 wherein step b) further comprises said timer mechanism using target latency for a read transaction most recently preceding said present read transaction to determine said dynamic target latency period.

26. The method of claim 22 wherein step b) further comprises said timer mechanism averaging target latencies for a plurality of read transactions preceding said present read transaction to determine said dynamic target latency period.

27. The method of claim 22 wherein step e) further comprises the steps of:

said PCI target device maintaining said access during said dynamic target latency period, thereby facilitating completing of said present read transaction; and said PCI target device retrying said access after said dynamic target latency period is exceeded.

28. The method of claim 22 wherein step e) further comprises the steps of:

said PCI target device retrying said access after claiming said access; and said PCI initiator device retrying said access after said dynamic target latency period is exceeded, thereby facilitating completion of said present read transaction.

* * * * *